United States Patent [19]

Oguri et al.

[11] Patent Number: 5,210,659
[45] Date of Patent: May 11, 1993

[54] VIDEO SIGNAL RECORDING AND EDITING APPARATUS

[75] Inventors: Akira Oguri, Kanagawa; Nobuyuki Sato, Shizuoka, both of Japan

[73] Assignee: Sony Corporation, Japan

[21] Appl. No.: 505,042

[22] Filed: Apr. 5, 1990

[30] Foreign Application Priority Data

Apr. 12, 1989 [JP] Japan .................................. 1-92346

[51] Int. Cl.⁵ .................. G11B 5/02; G11B 15/18; G11B 5/09
[52] U.S. Cl. .................................... 360/27; 360/72.2; 360/46
[58] Field of Search .................. 360/27, 65, 72.2, 13, 360/49, 46

[56] References Cited

U.S. PATENT DOCUMENTS

| | | | |
|---|---|---|---|
| 3,681,524 | 8/1972 | Nicholls | 360/72.2 |
| 4,274,116 | 6/1981 | Ida | 360/65 |
| 4,344,095 | 8/1982 | Furuta | 360/73 |
| 4,360,841 | 11/1982 | Mita | 360/13 |
| 4,360,843 | 11/1982 | Menezes et al. | 360/72.2 |
| 4,768,106 | 8/1988 | Ito et al. | 360/13 |

OTHER PUBLICATIONS

"The SMPTE D-1 Format and Possible Scanner Configurations", Takeo Eguchi, pp. 166–169, Feb. 1987.

Primary Examiner—Aristotelis Psitos
Assistant Examiner—Won Tae C. Kim
Attorney, Agent, or Firm—Ronald P. Kananen

[57] ABSTRACT

A video signal recording apparatus equipped with circuits to record a time code signal and a control signal relative to a tape position at a speed higher than a normal recording speed, whereby the time required for recording such signals can be widely shortened to reduce the time of the editing operation, hence enhancing the operational efficiency. Furthermore, the frequency of a bias signal is set to be higher than recordable signal frequencies determined in accordance with the normal tape speed, so that undesired generation of noise that may otherwise be derived from such bias signal can be prevented during the reproduction.

4 Claims, 3 Drawing Sheets

VIDEO SIGNAL RECORDING AND EDITING APPARATUS

BACKGROUND OF THE INVENTION

1. Field of the Invention

The present invention relates to a video signal recording apparatus and, more particularly, to an apparatus adapted for use in an editing system with a video tape recorder.

2. Description of the Prior Art

It has been customary heretofore that an editing operation employing a video tape recorder (VTR) is performed principally in the following procedure.

(1) First a time code signal and a control signal are recorded per roll on a magnetic tape at a normal recording speed.

(2) Subsequently a video signal and an audio signal are edited and recorded on the magnetic tape at the normal recording speed in accordance with the time code signal and the control signal already recorded.

In performing such editing operation with a VTR as mentioned, it is necessary to previously record both a time code signal and a control signal at a normal recording speed prior to recording desired video and audio signals, thereby requiring a prolonged time for the editing operation with another problem of a low operational efficiency.

OBJECT AND SUMMARY OF THE INVENTION

It is therefore an object of the present invention to provide an improved video signal recording apparatus which is capable of ensuring a high efficiency in such editing operation.

The present invention is equipped with circuits to record signals relative to a tape position at a tape speed higher than a normal recording speed.

A magnetic tape is driven at a speed higher than a normal recording speed. And the frequencies of a time code signal and a control signal relative to a tape position are raised in accordance with the increased tape speed. Meanwhile the frequency of a bias signal is set to be higher than recordable signal frequencies determined in accordance with the tape speed. And the signals relative to the tape position are recorded on the magnetic tape with the bias signal superposed thereon. As a result, the time required for the editing operation can be sidely shortened to consequently enhance the operational efficiency. And generation of noise that may otherwise be derived from such bias signal can be prevented during the reproduction.

According to one aspect of the present invention, there is provided a video signal recording apparatus comprising: speed control means for generating a recording speed control signal; driving means for driving a recording tape at a tape speed corresponding to the recording speed control signal, the tape speed being N times higher than a normal tape speed; signal generating means for generating a position control signal which has a frequency corresponding to the recording speed control signal, the frequency being N times higher than a normal frequency of the position control signal generated when the recording tape is driven at the normal tape speed; amplifier means for amplifying the position control signal; gain control means for controlling the gain of the amplifier means corresponding to the recording speed control signal; first recording means for recording the position control signal amplified by the amplifier means on a longitudinal track on the recording tape; and second recording means for recording a video signal on slant tracks on the recording tape at the normal tape speed in accordance with the position control signal previously recorded at the tape speed.

And according to another aspect of the present invention, there is provided a video signal recording apparatus comprising: mode selecting means for selecting one of first and second recording modes; driving means for driving a recording tape at one of first and second tape speeds conforming with the mode selected by the mode selecting means, the first tape speed being higher than the second tape speed; signal generating means for generating a position control signal which has a frequency conforming with the mode selected by the mode selecting means; amplifier means for amplifying the position control signal; gain control means for controlling the gain of the amplifier means in conformity with the mode selected by the mode selecting means; first recording means for recording the position control signal on a longitudinal track on the recording tape; and second recording means for recording a video signal on slant tracks on the recording tape; wherein, during the first recording mode, the position control signal is recorded on the longitudinal track a t the first tape speed while the video signal is not recorded on the slant tracks; and during the second recording mode, the video signal is recorded on the slant tracks at the second tape speed in accordance with the position control signal previously recorded during the first recording mode.

Other objects and aspects of the present invention will become apparent from the following description given with reference to the accompanying drawings.

DESCRIPTION OF THE PREFERRED EMBODIMENT

Hereinafter an exemplary embodiment of the present invention will be described in detail with reference to FIGS. 1 through 3.

Figure 1:
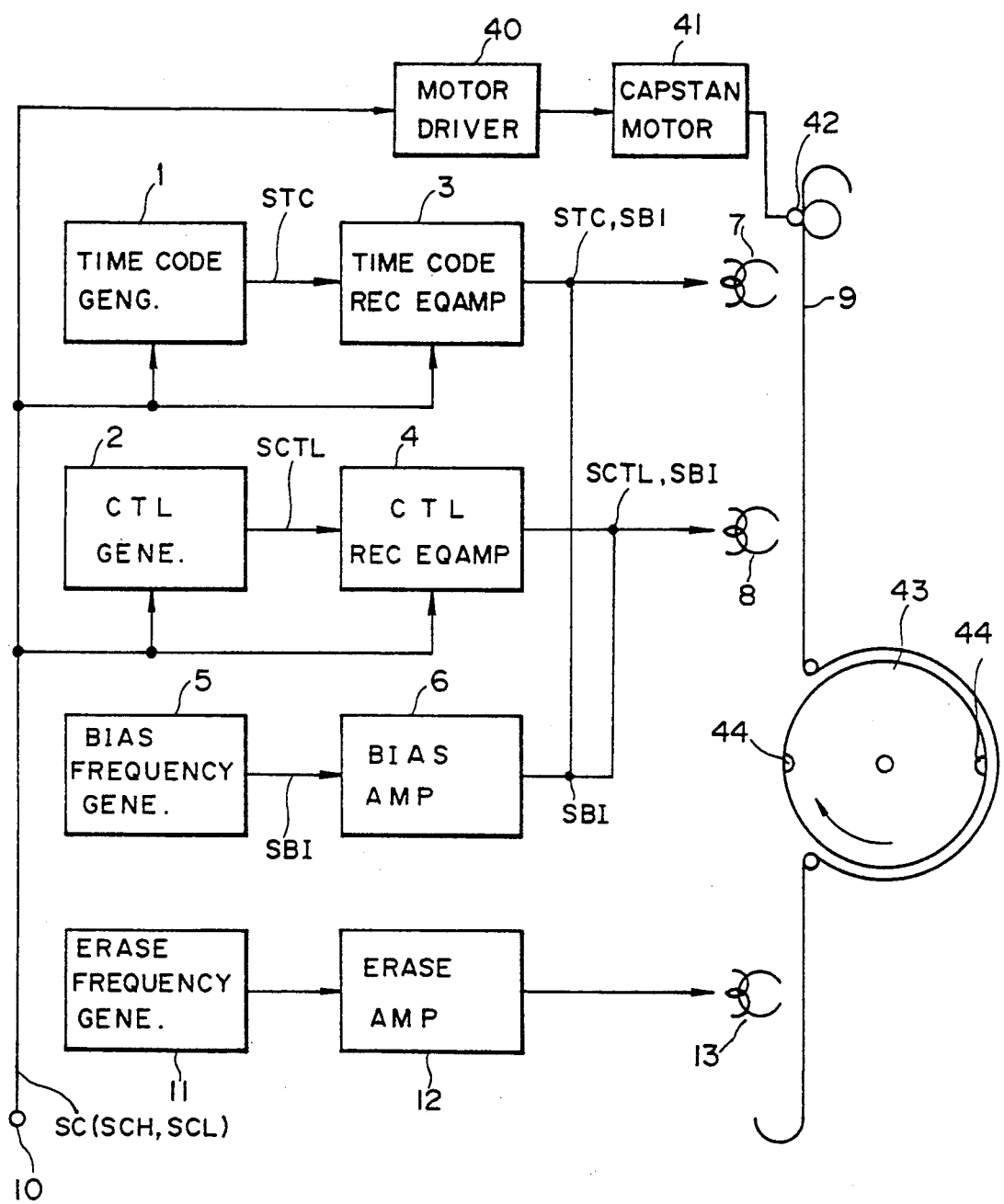
FIG. 1 is a block diagram of a video signal recording apparatus embodying the present invention.

In the constitution shown in FIG. 1, a time code signal STC is produced in a time code generator 1 with biphase modulation and then is supplied to an equalizing amplifier 3. Meanwhile a control signal SCTL is produced in a control signal generator 2 and is supplied also to an equalizing amplifier 4.

A bias signal SBI is produced in a bias signal generator 5. The frequency of this bias signal SBI is set to, e.g., 277 kHz which is higher than recordable signal frequencies determined in accordance with a tape speed, so that the bias signal SBI is not recorded if the tape speed is to be raised higher. The bias signal SBI thus obtained is supplied to a bias amplifier 6. The level of such bias signal SBI is set to the same value as in a normal speed recording mode.

The bias signal SBI is superposed on each of the equalized time code signal STC and control signal SCTL, and the resultant composite signals are supplied respectively to magnetic heads 7, 8 and are thereby recorded on a magnetic tape 9.

The above-described time code generator 1, control signal generator 2 and equalizing amplifiers 3, 4 are controlled by a control signal SC which serves to select either a high speed recording mode or a normal speed recording mode. For example, when the control signal SC supplied via a terminal 10 has a high level, all of the time code generator 1, the control signal generator 2 and the equalizing amplifiers 3, 4 are placed in a high speed recording mode. The magnetic tape 9 is driven by a capstan 42 which is rotated by a capstan motor 41 actuated under control of a motor driver 40. Furthermore a rotary drum 43 is driven by an unshown rotary-drum driving motor, and a video signal is recorded on slant tracks on the magnetic tape 9 by means of a rotary head 44.

During the high speed recording mode, the speed of the magnetic tape 9 is set to be N times higher than the normal recording speed, and the frequencies of both the time code signal STC and the control signal SCTL are also set to be N times higher in accordance with the tape speed which is N times higher. In this case, the gain of the equalizing amplifiers 3, 4 is switched to the level predetermined for the high speed recording mode as denoted by GH in FIG. 2.

Meanwhile during the normal speed recording mode, the speed of the magnetic tape 9 is set to the normal recording speed, and the frequencies of both the time code signal STC and the control signal SCTL are set to predetermined frequencies in accordance with the normal tape speed. In this case, the gain of the equalizing amplifiers 3, 4 is switched to the level predetermined for the normal speed recording mode as denoted by GL in FIG. 2. The number N mentioned above is changeable to any desired value by changing the conditions such as the circuit constant and so forth.

An erase signal produced in an erase signal generator 11 is supplied via an erase amplifier 12 to an erasing head 13.

Figure 3:
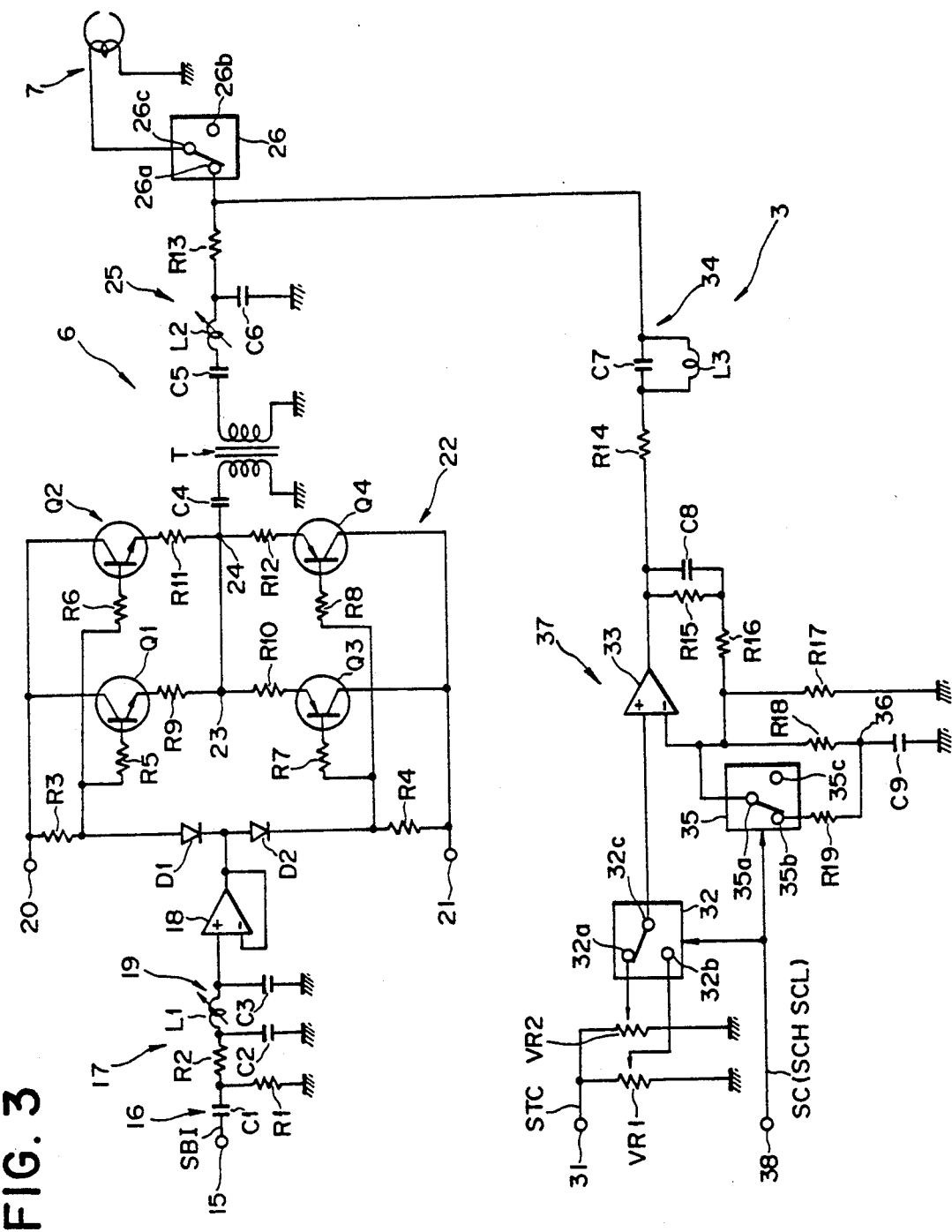
FIG. 3 is a circuit diagram of a bias amplifier and an equalizing amplifier.

Detailed circuit configuration of the above bias amplifier 6 and equalizing amplifiers 3, 4 are shown in FIG. 3.

In this diagram, the bias amplifier 6 has the following configuration.

A terminal 15 is connected to one end of a capacitor C1, whose other end is connected to one end of each of resistors R1, R2. The capacitor C1 and the resistor R1 constitute a high-pass filter 16 for cutting a DC component, and the other end of the resistor R1 is grounded.

Meanwhile the other end of the resistor R2 is connected to one end of each of a capacitor C2 and a coil L1. The resistor R2 and the capacitor C2 constitute a low-pass filter 17 for removal of high-frequency noise, and the other end of the capacitor C2 is grounded.

The other end of the coil L1 is connected to one end of a capacitor C3 and a positive terminal of a buffer amplifier 18. The coil L1 and the capacitor C3 constitute a resonance circuit 19 for minimizing the distortion, and the signal on the output side of such resonance circuit 19 is rendered sinusoidal in waveform. The other end of the capacitor C3 is grounded.

The output of the buffer amplifier 18 is connected to one input terminal thereof and also to a junction between a cathode of a diode D1 and an anode of a diode D2. The diodes D1 and D2 are provided for setting a DC bias.

A terminal 20, to which a voltage is applied from a power source, is connected to one end of a resistor R3 and also to collectors of transistors Q1, Q2. And another terminal 21, to which a voltage is applied from the power source, is connected to one end of a resistor R4 and also to collectors of transistors Q3, Q4. The transistors Q1, Q3 and the transistors Q2, Q4 constitute complementary SEPP circuits, respectively. Such two complementary SEPP circuits are arranged in parallel with each other to form a current booster 22.

The other end of the aforementioned resistor R3 is connected via resistors R5, R6 to the bases of the transistors Q1, Q2 respectively and also to the anode of the diode D1. Meanwhile the other end of the resistor R4 is connected via resistors R7, R8 to the bases of the transistors Q3, Q4 respectively and also to the cathode of the diode D2. The emitter of the transistor Q1 is connected via resistors R9, R10 to the emitter of the transistor Q3, and the emitter of the transistor Q2 is connected via resistors R11, R12 to the emitter of the transistor Q4.

The junction 23 of the resistors R9, R10 is connected to the junction 24 of the resistors R11, R12, and such two junctions 23, 24 are connected via a capacitor C4 to a primary terminal of a transformer T.

The transformer T is used for stepping up the input, and its secondary side is connected to one end of a DC-cutting capacitor C5. The other end of the capacitor C5 is connected to a resonance circuit 25 and a terminal 26a of a switch 26 via a resistor R13. The resonance circuit 25 comprises a coil L2, a capacitor C6 and an inductance component of a magnetic head 7, and the resonance frequency thereof is set to, e.g., 277 kHz.

In FIG. 3, the equalizing amplifiers 3, 4 are constituted as follows. Since the equalizing amplifiers 3, 4 are mutually the same in constitution, a description will be given merely with regard to the amplifier 3 alone in this embodiment.

A terminal 31 fed with the time code signal STC is connected to one end of each of gain control variable resistors VR1, VR2, whose slide contacts are connected to terminals 32b, 32a of a switch 32, respectively. The other ends of the variable resistors VR1, VR2 are grounded.

Another terminal 32c of the switch 32 is connected to a positive terminal of an operational amplifier 33. The output terminal of such operational amplifier 33 is connected via a resistor R14 and a bias trap 34 to a terminal 26a of a switch 26. The bias trap 34 comprises a capacitor C7 and a coil L3 connected in parallel with each other, and serves to prevent inflow of the bias signal SBI from the bias amplifier 6 to the equalizing amplifier 3 while supplying the time code signal STC efficiently to the magnetic head 7.

The output side of the operational amplifier 33 is connected to one end of a resistor R16 via a resistor R15 and a capacitor C8 which are connected in parallel with each other. The other end of the resistor R16 is connected to one end of each of resistors R17, R18, a terminal of a switch 35 and one terminal of the operational amplifier 33. The other end of the resistor R17 is grounded, and the other end of the resistor R18 is also grounded via a capacitor C9. The junction of the resistor R18 and the capacitor C9 is connected via a resistor R19 to a terminal 35b of the switch 35.

The above-described operational amplifier 33, resistors R15–R19 and capacitors C8, C9 constitute an equalizing amplifier 37.

A terminal 38 is fed with a control signal Sc for selecting a tape speed conforming with either a high speed recording mode or a normal speed recording mode, and the switches 32, 35 are controlled by such signal Sc individually.

The terminal 26a of the switch 26 disposed in relation to the magnetic head 7 is fed with a composite signal where the bias signal SBI is superposed on the time code signal STC. The switch 26 is selectively actuated in conformity with a recording mode and a reproducing mode. For example, the terminals 26a and 26c of the switch 26 are mutually connected during the recording mode, and the terminals 26b and 26c thereof are mutually connected during the reproducing mode.

Hereinafter the circuit operation will be described with reference to FIGS. 1 through 3.

In a state where the magnetic tape 9 is set in an unshown VTR, when the high speed recording mode is selected in response to a command for execution of a high speed recording operation, the magnetic tape 9 is rewound back to its start porition, and a high-level control signal SCH conforming with the high speed recording mode is supplied to the terminal 10, whereby all of the time code generator 1, the control signal generator 2 and the equalizing amplifiers 3, 4 are placed in the high speed recording mode. Meanwhile the high-level control signal SCH is supplied also to the motor driver 40, so that the capstan 42 is rotated at a speed conforming with the high speed recording mode, thereby running the magnetic tape 9 at a speed N times higher than the normal tape speed. Meanwhile the rotary drum 43 is driven at the normal speed.

In this stage of the operation, a time code signal STC and a control signal SCTL of N-times higher frequencies are outputted from the time code generator 1 and the control signal generator 2 respectively in accordance with the N-times higher tape speed and then are supplied to the equalizing amplifiers 3, 4 so as to be equalized. Since the constitutions of the two equalizing amplifiers 3, 4 are mutually the same in this embodiment, a description will be given merely with regard to the equalizing amplifier 3 as an example.

In the constitution of FIG. 3, the terminal 15 of the bias amplifier 6 is fed with a bias signal SBI which is outputted from the bias signal generator 5 and has a frequency of, e.g., 277 kHz higher than a range magnetically recordable.

The bias signal SBI is shaped to be sinusoidal in waveform through the high-pass filter 16, the low-pass filter 17 and the resonance circuit 19 and then is supplied via the buffer amplifier 18 to the current booster 22. The bias signal SBI amplified in the current booster 22 is stepped up by the transformer T and is supplied to the resonance circuit 25. Since the resonance frequency of this circuit 25 is set to 277 kHz, the amplified bias signal SBI is efficiently supplied to the terminal 26a of the switch 26.

Generally the range of recordable signal frequencies is raised in accordance with increase of the tape speed. However, in this embodiment of the constitution shown, the bias signal SBI is not recorded since the frequency thereof is rendered higher than the recordable signal frequencies in conformity with the N-times higher tape speed.

When the high-level control signal SCH is supplied to the terminal 38 of the equalizing amplifier 3, the switches 32, 35 are controlled in such a manner that the terminals 32a and 32c are mutually connected in the switch 32, while the terminals 35a and 35b are mutually connected in the switch 35. The time code signal STC obtained from the terminal 31 is controlled with respect to the gain by the variable resistor VR2 and then is supplied to the positive terminal of the operational amplifier 33.

Since the terminals 35a and 35b are mutually connected in the switch 35, a parallel combined resistance value is formed in the resistors R18, R19. Due to the fact that such parallel combined resistance value is smaller than the value of each of the resistors R18 and R19, the gain in the high frequency range of the time code signal STC is raised as denoted by GH in FIG. 2. Such time code signal STC is supplied to both the bias trap 34 and the terminal 26a of the switch 26.

As a result, the bias signal SBI is superposed on each of the time code signal STC and the control signal SCTL, and the composite signal thus obtained are supplied to the magnetic heads 7 and 8 respectively.

When the high speed rotations of the capstan 42 and the rotary drum 43 have reached a steady state, a high speed recording operation is started automatically to record both the time code signal STC and the control signal SCTL. During such high speed recording mode, the rotary drum 43 is driven at the normal rotation speed, but none of video signal is recorded on the magnetic tape 9 by the rotary head 44.

Consequently, the time code signal STC and the control signal SCTL are recorded at the high speed while the magnetic tape 9 is forwarded fast, thereby widely shortening the required time for the editing operation to eventually enhance the operational efficiency. Furthermore, since the bias signal SBI is not recorded, it becomes possible to prevent undesired generation of noise that may otherwise be derived from the bias signal SBI during the reproducing mode.

Upon arrival of the recording at the tape end position, the recorded magnetic tape 9 is rewound back to the tape start position to terminate the high speed recording operation. Thereafter a video signal and an audio signal are recorded at the normal recording speed in accordance with the time code signal STC and the control signal SCTL already recorded during the high speed recording mode.

Now a recording operation performed in the normal speed recording mode will be described below.

In a state where the magnetic tape 9 is set in an unshown VTR, when the normal speed recording mode is selected in response to a command for execution of a normal speed recording operation, the magnetic tape 9 is rewound back to its start position, and a low-level control signal SCL conforming with the normal speed recording mode is supplied to the terminal 10, whereby all of the time code generator 1, the control signal generator 2 and the equalizing amplifiers 3, 4 are placed in the normal speed recording mode. In this case, both the capstan 42 and the rotary drum 43 are driven at the normal speed to run the magnetic tape 9 forward at the normal speed.

The time code signal STC and the control signal SCTL of predetermined frequencies conforming with the normal tape speed are outputted from the time code generator 1 and the control signal generator 2 respectively and then are supplied to the equalizing amplifiers 3, 4.

In the constitution of FIG. 3, a bias signal SBI having a frequency of, e.g. 277 kHz, is outputted from the bias signal generator 5 and is supplied to the terminal 15.

The bias signal SBI is amplified in the same manner as in the aforementioned high speed recording mode and then is supplied to the terminal 26a of the switch 26.

When the low-level control signal SCL is supplied to the terminal 38 of the equalizing amplifier 3, the switches 32, 35 are controlled in such a manner that the terminals 32b and 32c are mutually connected in the switch 32, while the terminals 35a and 35c are mutually connected in the switch 35. The time code signal STC obtained from the terminal 31 is controlled with respect to the gain by the variable resistor VR1 and then is supplied via the switch 32 to the positive terminal of the operational amplifier 33.

Figure 2:
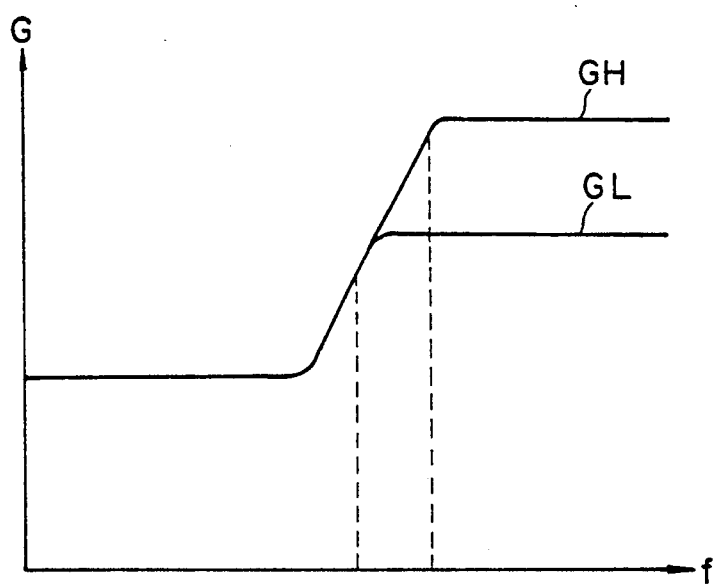
FIG. 2 graphically shows the frequency characteristics of an equalizing amplifier.

Since the terminals 35a and 35c are mutually connected in the switch 35, one end of the resistor R19 is rendered open so that the gain in the high frequency range of the time code signal STC is lowered to a predetermined level denoted by GL in FIG. 2. Such time code signal STC is supplied to both the bias trap 34 and the terminal 26a of the switch 26 in the same manner as in the aforementioned high speed recording mode.

As a result, the bias signal SBI is superposed on each of the time code signal STC and the control signal SCTL, and the composite signals thus formed are supplied to the magnetic heads 7 and 8 respectively.

When the rotations of both the capstan 42 and the rotary drum 43 have reached a steady state, the time code signal STC and the control signal SCTL are automatically recorded at the normal tape speed.

As described, the frequency of the bias signal SBI is set to 227 kHz which is higher than the recordable signal frequencies determined in accordance with the tape speed, so that the bias signal SBI is not recorded and thus it becomes possible to prevent undesired generation of noise that may otherwise be derived therefrom during the reproduction.

There are two cases in the normal speed recording mode. In one case, the time code signal STC and the control signal SCTL alone are recorded as in the high speed recording mode; and in another case, video and audio signals are also recorded simultaneously therewith. In the former case, the magnetic tape 9 is rewound when recorded up to its end position, and the recording operation is terminated upon arrival at the tape start position. Thereafter the video and audio signals are recorded at the normal speed in accordance with the time code signal STC and the control signal SCTL already recorded.

The video signal recording apparatus mentioned above may be employed as a sole unit or may be incorporated in a video tape recorder.

According to the video signal recording apparatus of the present invention, signals relative to a tape position are recorded at a tape speed higher than a normal recording speed, whereby advantageous effects are achieved in widely shortening the required time for recording the signals relative to the tape position and also the required time for the editing operation to consequently enhance the operational efficiency.

What is claimed is:

1. A video signal recording and reproducing apparatus having an editing function for editing a video signal reproduced by said recording an reproducing apparatus based on a pre-recorded position control signal recorded on a longitudinal track of a recording tape, said apparatus comprising:
   speed control means for generating a recording speed control signal;
   driving means for driving said recording tape at a first tape speed or at a higher tape speed corresponding to a low value or a high value of said recording speed control signal, respectively, said higher tape speed being N times higher than said first tape speed when said recording speed control signal is at said high value, wherein N is a number greater than 1;
   signal generating means for generating said position control signal which has a higher or lower frequency corresponding to the low value or the high value respectively of said recording speed control signal, said higher frequency being N times higher than a first frequency of said position control signal, said first frequency being generated when said recording tape is driven at said first tape speed;
   amplifier means for amplifying said position control signal;
   gain control means for controlling the gain of said amplifier means corresponding to the low value or the high value of said recording speed control signal;
   first recording means for first recording at said higher tape speed said position control signal amplified by said amplifier means on a longitudinal track on said recording tape;
   means for reproducing said position control signal recorded on said longitudinal track of said recording tape; and
   second recording means for next recording a video signal on slant tracks on said recording tape at said first tape speed in accordance with said position control signal previously recorded at said higher speed and reproduced with said reproducing means.

2. A video signal recording and reproducing apparatus having an editing function for editing a video signal reproduced by said recording and reproducing apparatus based on a pre-recorded position control signal recorded on a longitudinal track of a recording tape, said apparatus comprising:
   speed control means for generating a recording speed control signal;
   driving means for driving said recording tape at a first tape speed or at a higher tape speed corresponding to a low value or a high value of said recording speed control signal, respectively, said higher tape speed being N times higher than said first tape speed when said recording speed control signal is at said high value, wherein N is a number greater than 1;
   signal generating means for generating said position control signal which has a higher or lower frequency corresponding to the low value or the high value respectively of said recording speed control signal, said higher frequency being N times higher than a first frequency of said position control signal, said first frequency being generated when said recording tape is driven at said first tape speed;
   amplifier means for amplifying said position control signal;
   gain control means for controlling the gain of said amplifier means corresponding to the low value or the high value of said recording speed control signal;
   first recording means for first recording at said higher tape speed said position control signal amplified by said amplifier means on a longitudinal track on said recording tape;

means for reproducing said position control signal recorded on said longitudinal track of said recording tape; and second recording means for next recording a video signal on slant tracks on said recording tape at said first tape speed in accordance with said position control signal previously recorded at said higher speed and reproduced with said reproducing means;

said apparatus further comprising:

second signal generating means for generating a time code signal which represents an address of said recording tape and has a higher or lower frequency corresponding to the high value or the low value respectively of said recording speed control signal;

second amplifier means for amplifying said time code signal corresponding to the high value or the low value of said recording speed control signal;

second gain control means for controlling the gain of said second amplifier corresponding to the high value or the low value of said recording speed control signal; and third recording means for recording said time code signal amplified by said second amplifier means on a second longitudinal track on said recording tape.

3. A video signal recording apparatus comprising:

mode selecting means for selecting one of a first and second recording modes;

driving means for driving a recording tape at one of first and second tape speeds conforming with the mode selected by said mode selecting means, said first tape speed being higher than said second tape speed;

signal generating means for generating a position control signal which has a frequency conforming with said one mode selected by said mode selecting means;

amplifier means for amplifying said position control signal;

gain control means for controlling the gain of said amplifier means in conformity with said one mode selected by said mode selecting means;

first recording means for recording said position control signal on a longitudinal track on said recording tape;

means for reproducing said position control signal recorded on said longitudinal track of said recording tape; and second recording means for recording a video signal on slant tracks on said recording tape;

wherein, during said first recording mode, said position control signal is recorded on said longitudinal track at said first tape speed while said video signal is not recorded on said slant tracks; and during said second recording mode, said video signal is recorded on said slant tracks at said second tape speed in accordance with said position control signal previously prerecorded during said first recording mode at said higher tape speed and reproduced with said reproducing means.

4. A video signal recording apparatus comprising:

mode selecting means for selecting one of a first, second and third recording modes;

driving means for driving a recording tape at a first tape speed when said first mode is selected by said mode selecting means or at a second tape speed when said second or third mode is selected by said mode selecting means, said first tape speed being higher than said second tape speed;

signal generating means for generating a first position control signal of a first frequency when said first mode is selected by said mode selecting means, or generating a second position control signal of a second frequency when said third mode is selected by said mode selecting means, said first frequency being higher than said second frequency;

amplifier means for amplifying the generated position control signal;

gain control means for controlling the gain of said amplifier means conforming with said mode selected by said mode selecting means;

first recording means for recording said generated position control signal on a longitudinal track on said recording tape;

second recording means for recording a video signal on slant tracks on said recording tape; and means for reproducing said video signal from said recording tape based on said position control signal recorded on said longitudinal track of said recording tape;

wherein, during said first recording mode said first position control signal is recorded at said higher first tape speed, during said second recording mode, said video signal is recorded on said slant tracks at said second tape speed in accordance with said first position control signal which is previously prerecorded during said first recording mode; and during said third recording mode, said video signal and said second position control signal of said second frequency are respectively recorded on said slant tracks and said longitudinal track at said second tape speed.

* * * * *